Figure 1:
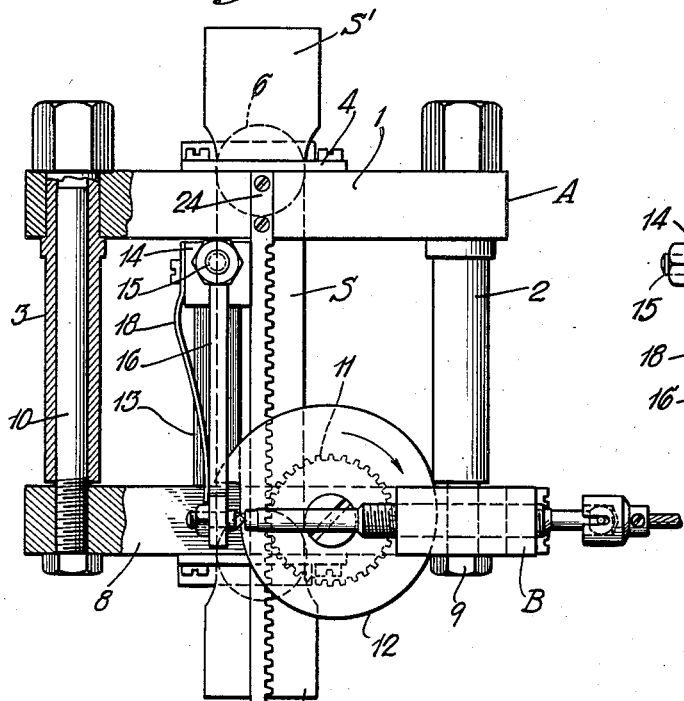

Dec. 19, 1939.  Q. McG. HENDERSON  2,183,909
EXTENSOMETER DEVICE
Filed July 16, 1936  2 Sheets-Sheet 1

INVENTOR
QUINTIN McGILL HENDERSON
BY
ATTORNEYS

Dec. 19, 1939.  Q. McG. HENDERSON  2,183,909
EXTENSOMETER DEVICE
Filed July 16, 1936  2 Sheets-Sheet 2
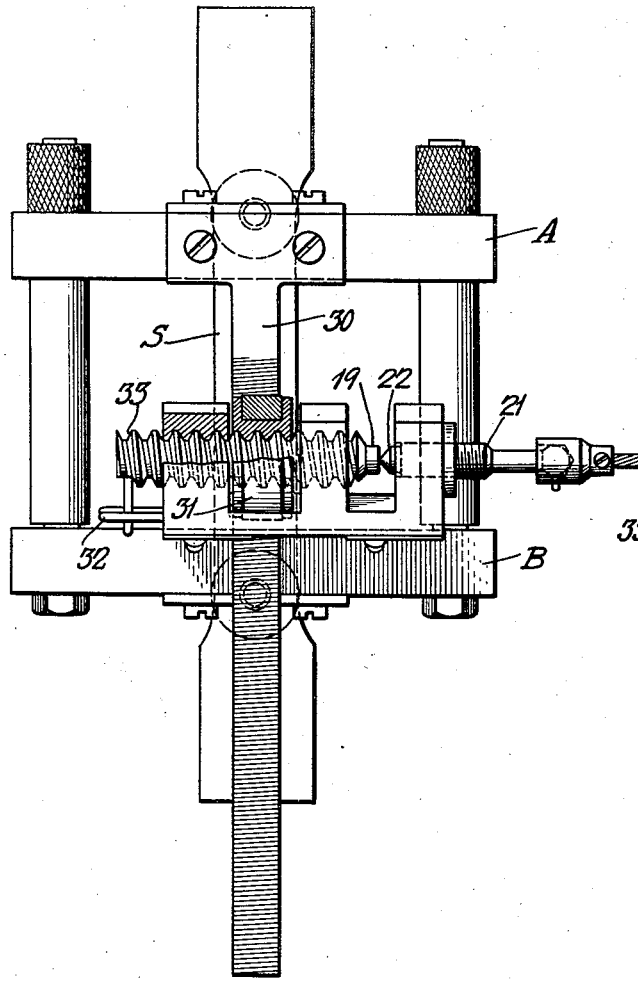
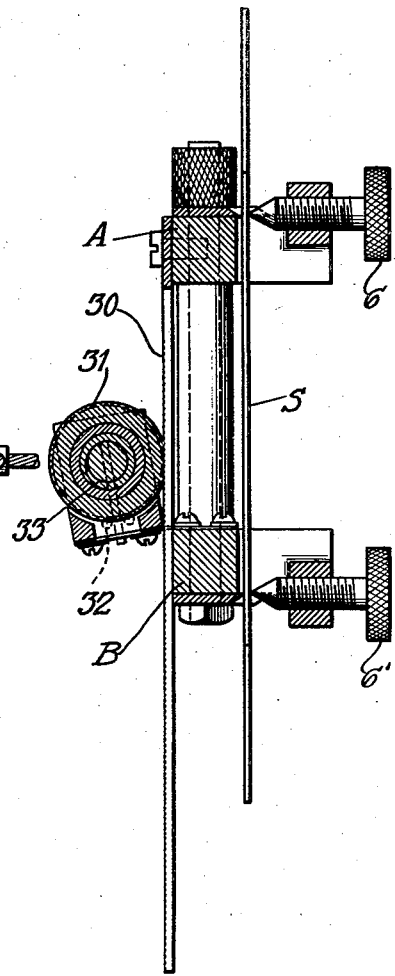
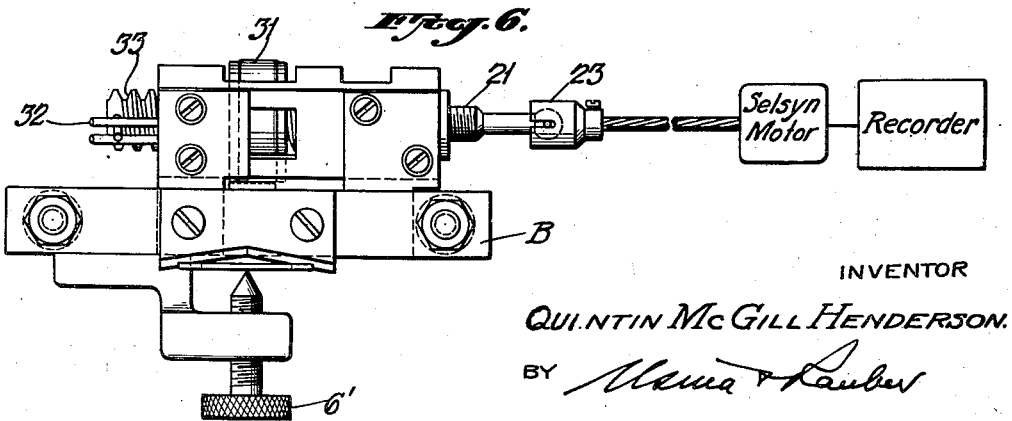
INVENTOR
QUINTIN McGILL HENDERSON.
BY
ATTORNEYS Patented Dec. 19, 1939

2,183,909

UNITED STATES PATENT OFFICE 2,183,909

EXTENSOMETER DEVICE

Quintin McGill Henderson, Kearny, N. J., assignor to United States Steel Corporation, New York, N. Y., a corporation of New Jersey Application July 16, 1936, Serial No. 90,988

2 Claims. (Cl. 33—147)

This invention relates to extensometer devices and to an improvement thereof adapting the same to measure the total strain or deformation of a specimen tested in tension. Extensometer devices are used in the testing of materials under tension. Heretofore in the art they have been adapted to determine the proportional limit and yield strength of materials. It is frequently desired to obtain information concerning the behavior of such material between the yield point and rupture.

It is one of the objects of this invention to provide means to obtain this information. Another object is to provide an extensometer device adapted to measure the total strain or deformation of a material up to the point of rupture of the said material. Still another object of this invention is to provide an improved extensometer device in which all danger of injury to the device through premature rupture of the material being tested is eliminated. Other objects and advantages will be apparent as the invention is more fully disclosed.

In accordance with these objects I have devised an extensometer device consisting of two telescoping sections adapted to be attached one at each end of the specimen being tested, with means to transmit the relative motion of the two telescoping parts representing the elongation of the specimen through a mechanism whose final movement is exactly proportional to this elongation, and means to magnify this proportional movement for purposes of indicating or recording the same.

The mechanism of the said transmitting means may be widely varied without departure from the present invention. It may comprise, for example, a rack and pinion operating a measuring cam; a bar and friction wheel operating a measuring screw; a rack and pinion operating a measuring drum; a rack and gear operating a measuring screw; or a wedge operating a measuring follower.

The means for magnifying this proportional movement of the mechanism of the said transmitting means may also be varied extensively without departure from the present invention. It may comprise an electrical means, mechanical means or an optical means. For example, the electrical means may utilize a pair of self-synchronizing motors adapted to transmit the movement of the mechanically operating transmitting means to a distant indicating or recording apparatus capable of magnifying the resultant motion; the mechanical means may comprise a rigid or a flexible connection between the extensometer and the indicating or recording apparatus; and the optical means may comprise a rotating mirror or prism in combination with means to indicate or record the movement of the said mirror or prism.

As one specific embodiment of the present invention I will describe the same utilizing the rack and pinion operating a measuring cam means for transmitting the relative movement of the cam to an electrically operated means which actuates a recorder device magnifying and recording the movement of the cam.

Figure 2:
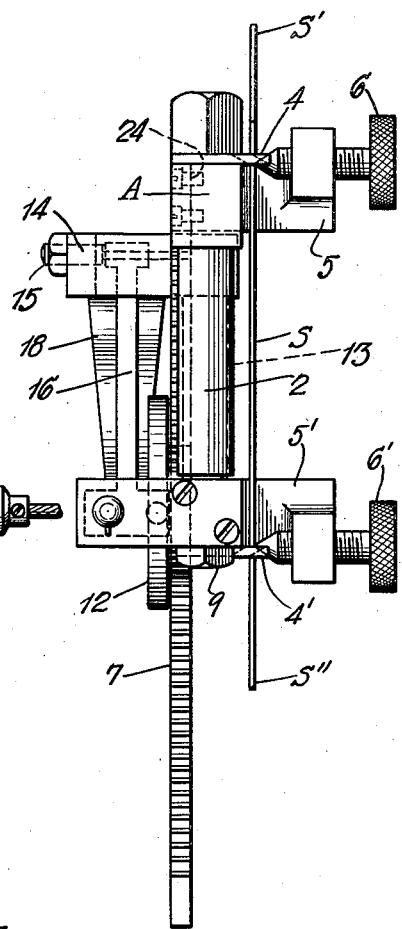
Figure 3:
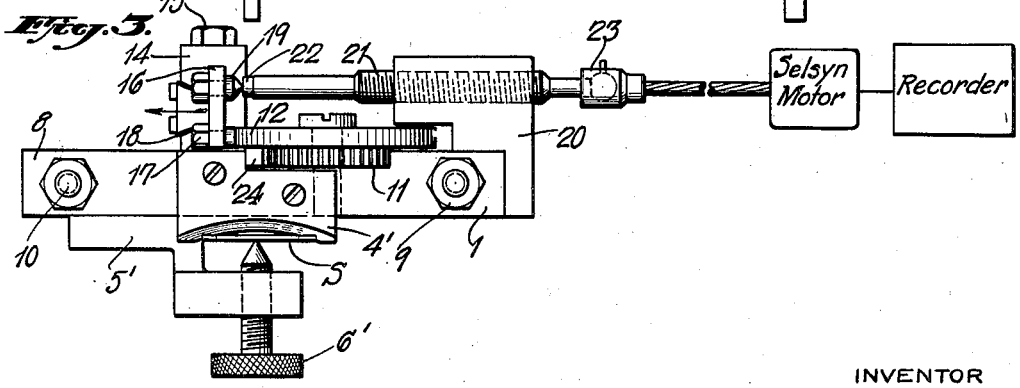

Figs. 1, 2 and 3 of the accompanying drawings illustrate this specific embodiment, Fig. 1 being a front elevational view; Fig. 2 a side elevational view; and Fig. 3 a bottom view of the same.

Referring to Figs. 1, 2 and 3, the extensometer device is shown in its mounted position upon a specimen S ready for testing. The two ends S' and S'' of the specimen are gripped in the usual manner by means provided in the usual vertical type tensile testing apparatus (not shown). In such testing device the lower gripping means is stationary while the upper gripping means is movable vertically.

The extensometer device of the present invention comprises two telescoping parts A and B. The top part A is attached to the specimen S at a point above the point of rupture of the specimen and the bottom part B is attached to the specimen S at a point below the point of rupture of the specimen.

The top part A comprises a square section cross-bar 1 with two hollow cylinders 2 and 3 fastened one on each end thereof equidistant from the center of bar 1 and at 90° to its major axis.

On the upper face of the cross bar 1 is a hardened steel knife edge 4 (Fig. 2) with a concave face and on the front face of the bar 1 is a bracket 5 (Fig. 3) carrying a sharp pointed pinching screw 6. Together the arrangement forms the means for attaching the top part A to specimen S. The centers of the knife edge 4 and screw 6 are coincident with the center line of the cross bar 1.

To the back face of the bar 1 is fastened a straight toothed rack 7, the pitch line of the rack 7 being disposed along the center line of the bar 1. This rack 7 extends downwardly from bar 1 beyond the bottom part B substantially as indicated in Fig. 1.

The bottom part B comprises a square section cross bar 8 provided with two solid cylinders 9 and 10 fastened one on each end thereof equidistant from the center of the bar 8 and at 90° to its major axis, in such position relative to hollow cylinders 2 and 3 as to permit solid cylinders 9 and 10 to telescope within hollow cylinders 2 and 3. Means 4', 5' and 6' (Figs. 2 and 3) substantially identical to the means 4, 5 and 6 heretofore described with respect to the top part A are similarly provided on the bottom part B for attaching the bottom part B to the specimen S.

On the back face of bar 8 is disposed a spur gear 11, pivoted to the bar 8 and engaging with the rack 7 extending downwardly from top part A when the extensometer device is in the closed position indicated in the drawings. To the face of this spur gear 11 is pinned cam 12 provided with a constant rise peripheral surface which rotates with spur gear 11 about the same center in the direction indicated by arrows in Fig. 1 when the two parts A and B are separated by being moved relative to each other along the axes of cylinders 2—3 and 9—10.

Between the solid cylinders 9—10 and fastened to the inside face of cross bar 8 is a short square rod 13 extending vertically upward upon the top of which is disposed yoke 14 provided with an adjustable pivot screw 15, the assembly forming a housing for pivoted lever 16, the free end of which lever 16 extends downwardly past the cam 12. A rider 17 is fastened to the end of lever 16 and is held against the face of cam 12 by the action of leaf spring 18. Any movement of cam 12 therefore is transmitted to lever 16.

Immediately adjacent rider 17 and movable therewith is disposed an electrical contact 19. Fastened to the end of cross bar 8 is bracket 20 comprised of insulating material, having a threaded opening therethrough having its axis parallel to the axis of bar 8 and in alignment with contact 19 and at 90° to the pivoted lever 16. A spindle 21 is threaded through this threaded opening in bracket 20, upon the end of which spindle 21 is provided an electrical contact 22 adapted to engage contact 19 on lever 16.

The end of spindle 21 is connected by universal joint 23 to what is known in the art as a selsyn motor which substantially comprises a pair of self-synchronizing motors electrically connected to be energized or deenergized upon the making or breaking of an electrical contact (as at 19—22) thereby causing a rotation of the spindle 21 which is forward or reverse depending upon whether it is desired to follow the movement of the contact 19 to thereby maintain an open or closed circuit therewith. In the instant case, it is desired to maintain electrical contact between contacts 19 and 22. The motor means accordingly is connected in such manner that as contact 19 is moved outwardly (to the left Fig. 3) as indicated by dotted arrow thereby breaking electrical contact with contact 22, the motor operates to actuate spindle 21 in the direction adapted to close electrical connection between contacts 19 and 22. The instant electrical connection is made, however, further energizing of the motor means ceases until the circuit is again broken by the movement of contact 19 to the left in the direction of the arrow.

This particular means of maintaining electrical connection between contacts 19 and 22 forms no part of the present invention and is a means heretofore known in the art. The recording of the movement of contact 19 by this particular means also forms no part of the present invention, it heretofore having been adapted for this purpose.

In the practical use of the extensometer device as hereinabove described, the two separated parts of the device are brought together in the closed position indicated in Fig. 1 by turning spindle 21 backward a distance more than equal to the total rise obtained by cam 12. The cam 12 then is rotated by hand until the rider 17 on lever 16 is resting on the edge of the highest part of cam 12. Rack 7 then is inserted in slot 24 and engaged with gear 11 and the telescoping cylinders 2—3 and 9—10 brought into alignment and the two parts A and B pushed together. In pushing the parts A and B together, rack 7 drives gear 11 thereby rotating cam 12 around to the point where rider 17 rests against the low point of the cam 12. The device then is in position for mounting upon the specimen S.

When the electric current is connected to the recorder device the open circuit across contacts 19 and 22 causes the selsyn motor to operate to rotate spindle 21 in a direction to close contacts 19 and 22 at which closing the motor is de-energized.

When load is applied to specimen S any stretch in the specimen is transmitted directly by rack 7 to gear 11 thence to cam 12, which rotates thereby pushing lever 16 to the left and moving contact 19 away from contact 22 thereby breaking the electric circuit to the selsyn motor which immediately is energized to rotate spindle 21 thereby moving contact 22 to a position adapted to close the circuit by making contact with contact 19. This sequence continues until rupture occurs in specimen S and the top part A pulls completely away from bottom part B.

The extensometer device of the present invention may be made in various sizes adapting the same for use with different sizes of specimens S. One standard size specimen comprises sheet material having a two inch gauge length by half inch width. The thickness of the sheet may vary up to about eight gauge.

For this particular size specimen the length of hollow cylinders 2—3 is adapted to provide a distance of exactly two inches between knife edges 4—4' when the device is in the closed position as shown. In order to obtain a recording of 100% elongation of a two inch gauge length, gear 11 is provided with a pitch diameter of .666 inch. The circumference of this pitch circumference would be 2.092 inches. As only two inches of this circumference is required the length of rack 7 extending below the horizontal diameter of gear 11 is approximately two inches.

The cam 12, however, is designed for a slightly greater extension than 2 inches. This feature allows a certain freedom in setting the starting point. This arrangement is purely arbitrary and is selected primarily because the recording apparatus is provided with three rates of strain recording of a ratio of 1, 2 and 4. The chart paper is ten inches wide. On the low ratio eight (8) revolutions of the selsyn motor is equal to ten (10) inches of pen travel. The high rate equals forty (40) inches of pen travel. I have merely selected eight (8) revolutions of the selsyn motor as being the most suitable number when a two (2) inch gauge length is being measured. This gives a strain magnification of 5, 10 and 20 depending upon which rate is being used.

As spindle 21 is threaded fifty (50) threads to the inch, eight (8) revolutions would equal 8/50 inch or .160 inch which is the distance the spindle 21 advances in 100% elongation. Therefore the rise on cam 12 should be .160 inch of each two (2) inch pitch circumference of gear 11.

As a second specific embodiment of the present invention reference should be made to the drawings Figs. 4, 5 and 6. The separable parts A and B of the extensometer device are substantially identical to that heretofore described in the embodiment of Figs. 1, 2 and 3. I have replaced the rack 7, gear 11 and cam 12 and associated means for moving contact 19 away from contact 22 with what is known as a bar and friction wheel arrangement operating a measuring screw.

Referring to Figs. 4, 5 and 6, in place of rack 7 on the top part A (as in Figs. 1, 2 and 3) I provide a friction bar 30. On the bottom part B I provide a friction wheel 31 disposed in such position as to ride on bar 30 and to be rotated thereby. Means 32 are provided to transmit the rotary motion of friction wheel 31 to measuring screw 33, on one end of which is disposed electrical contact 19. Spindle 21 is mounted similarly as heretofore described with respect to Figs. 1, 2 and 3 and carries on the end thereof contact 22, which spindle 21 is actuated through universal joint 23 by the selsyn motor arrangement as heretofore described.

This arrangement of elements has many advantages over that of the modification illustrated in Figs. 1, 2 and 3, but is not adapted for extreme sensitivity in measuring which is often desired in experimental research work.

In place of the rack and pinion operating a measuring cam arrangement of Figs. 1, 2 and 3 or the bar and friction wheel operating a measuring screw arrangement of Figs. 4, 5 and 6, I may adapt the other equivalent mechanisms above identified to the purpose of the present invention.

Having broadly and specifically described the present invention and having given two specific embodiments thereof, it is apparent that many modifications and adaptations may be made without essentially departing from the present invention and all such modifications and adaptations are contemplated as may fall within the scope of the following claims.

What I claim is:

1. An extensometer device comprising two separable and telescoping parts each provided with means to attach the part to a specimen being tested under tension at opposite sides of the point of rupture thereof, mechanism including a rack attached to one of said parts, a pinion gear attached to the other of said parts in a position to engage said rack, and a cam actuated by said gear to operate a movable contact a distance bearing a direct ratio to the distance traveled by said rack incident to a separating of said parts through the stretching of said material and means cooperating with said movable contact to record the movement of the same in magnified ratio.

2. An extensometer device comprising two separable and telescoping parts each provided with means to attach the part to a specimen being tested under tension at opposite sides of the point of rupture thereof, mechanism including a rack attached to one of said parts, a pinion gear attached to the other of said parts in a position to engage said rack, and a cam actuated by said gear to operate a movable contact a distance bearing a direct ratio to the distance traveled by said rack incident to a separating of said parts through the stretching of said material and electrically operating means cooperating with said movable contact to record the movement of the same in magnified ratio.

QUINTIN McGILL HENDERSON.